United States Patent Office 3,375,731
Patented Apr. 2, 1968

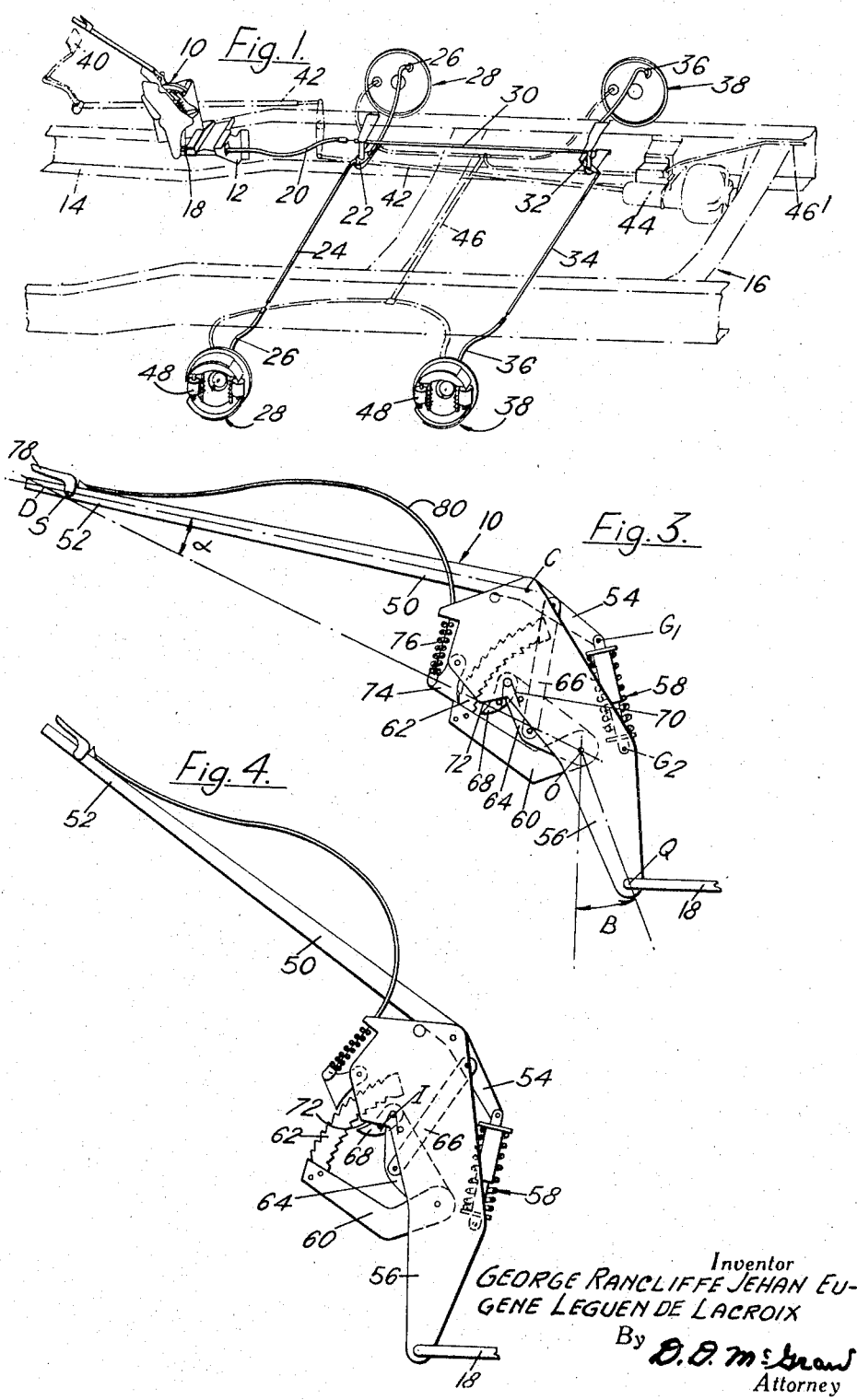

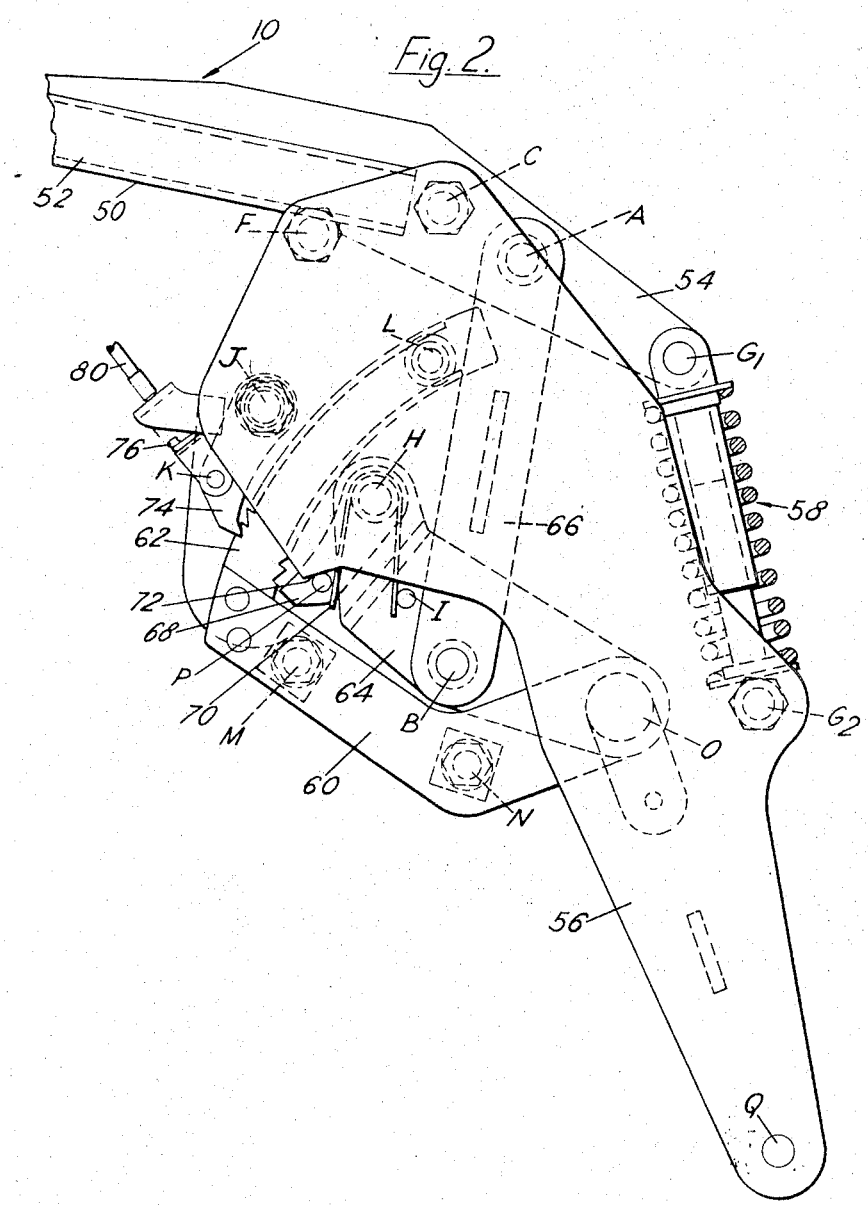

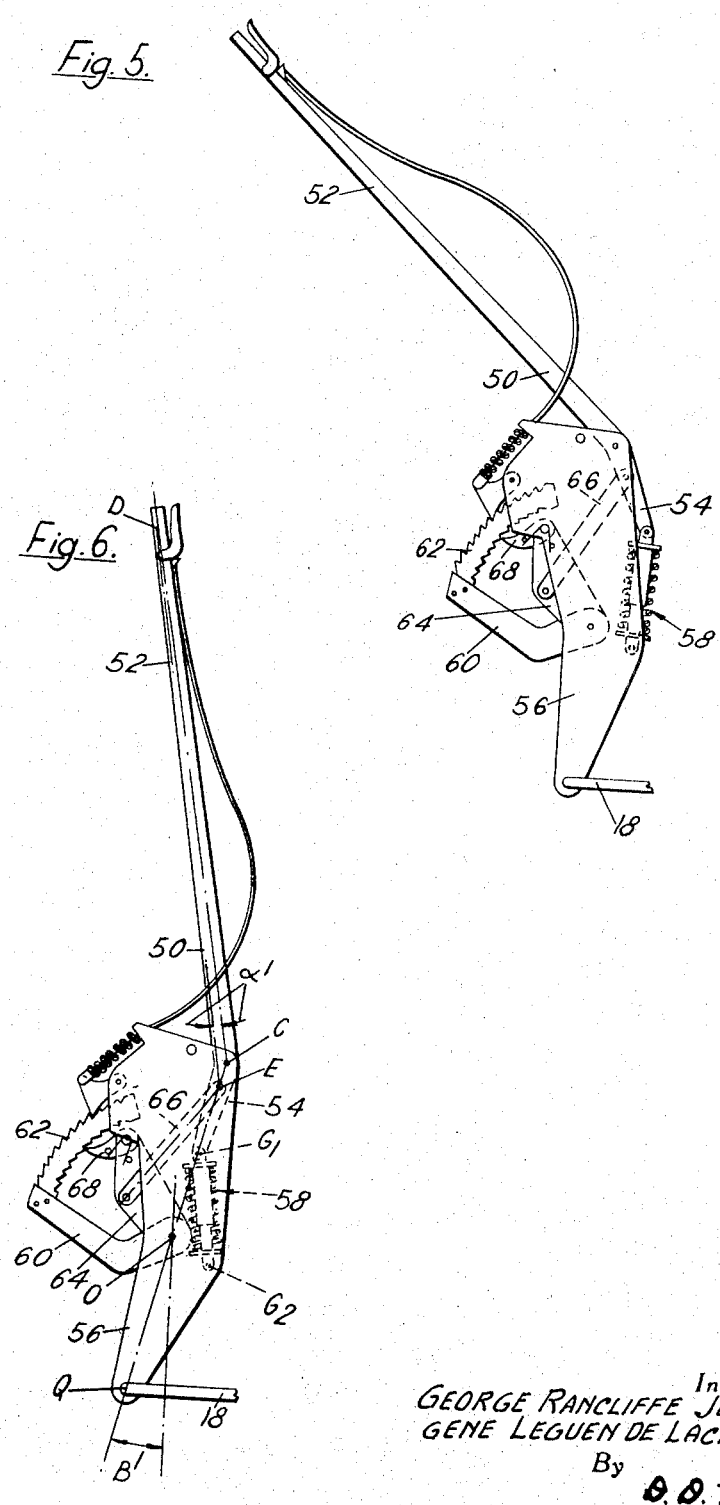

3,375,731
VARIABLE-RATIO LEVER MECHANISMS
George Rancliffe Jehan Eugene Leguen de Lacroix, Halesworth, Suffolk, England, assignor to General Motors Corporation, a corporation of Delaware
Filed May 31, 1966, Ser. No. 554,175
Claims priority, application Great Britain, June 12, 1965, 24,909/65
8 Claims. (Cl. 74—516)

This invention relates to variable-ratio lever mechanisms which produce in an initial portion of a stroke a large output movement with a low output force, and in a final portion of the stroke a high output force.

Such mechanisms can be used in vehicles, for example in a motor vehicle handbrake system, to give an initial quick take-up of slack in an output linkage, for example a cable or rod system, at a low mechanical advantage, followed by a final increment of movement at a high mechanical advantage.

According to the invention, a variable-ratio lever mechanism comprises a manual lever having a first, manually movable arm and a second arm, an output actuator lever, a fixed pivot intermediate the ends of the output actuator lever, the output actuator lever having one end portion on which the manual lever is pivotally mounted and another end portion which is connected to an output linkage, the second arm of the manual lever being pivotally connected to one end of a resiliently yieldable link the other end of which is pivotally connected to the output actuator lever at a point spaced from the fixed pivot, and a link member pivotally connecting the manual lever at a point between the pivot for the yieldable link and the mounting pivot for the manual lever to a pawl lever one end portion of which is pivotally mounted on the fixed pivot and the other end portion of which forms a pivotal mounting for a locking pawl which in one position of the mechanism can engage a fixed ratchet, the arrangement being such that in an initial increment of movement of the manual lever the mechanism moves as a whole about the fixed pivot, in a further increment of movement the yieldable link yields at a design output load and allows the link member to move the pawl lever about the fixed pivot to bring the locking pawl into engagement with the fixed ratchet, and in a final increment of movement a four-bar chain mechanism constituted by one arm of the manual lever, the link member, the pawl lever and the output actuator lever produces an increased mechanical advantage at the output actuator lever.

The yieldable link may comprise a compression spring assembly. By the use of an over-centre action, the compression spring assembly can be made to assist loading in the output linkage during the final increment of movement of the manual lever, thus increasing the overall mechanical advantage of the mechanism.

The locking pawl may be resiliently biased towards the fixed ratchet, and, during the initial increment of movement of the manual lever, be maintained out of contact with the fixed ratchet by a pin-and-abutment connection between the locking pawl and the output actuator lever.

The fixed ratchet may have two sets of teeth, one set comprising the fixed ratchet teeth engageable by the release pawl, these teeth being disposed on a convexly arcuate surface of the fixed ratchet, and the other set comprising the teeth engageable by the locking pawl, these teeth being disposed on a concavely arcuate surface of the fixed ratchet, with both sets of teeth facing in the same direction.

The mechanism may include a release pawl pivotally mounted on the output actuator lever and resiliently biased into engagement with the fixed ratchet teeth to prevent return movement of the mechanism, and a release lever mounted on one arm of the manual lever and actuable to disengage the release pawl from the fixed ratchet teeth. The release lever and the release pawl may for example be interconnected by means of a Bowden cable.

The output actuator lever may have an abutment for limiting movement of the manual lever relatively to the actuator lever in the release direction.

The output actuator lever may comprise a pair of spaced side plates between which the remaining parts of the mechanism are mounted. In this way a symmetrical construction can be achieved, for favourable distribution of the forces acting on the mechanism; the output actuator lever also gives some protection to the remaining parts of the mechanism.

The manual lever, the output actuator lever and the pawl lever may each be cranked, as seen in elevation, such that the three pivotal connections for each of these levers do not lie on a straight line.

The invention also comprehends a variable-ratio lever mechanism as aforesaid which instead of being operated directly is operated remotely, by the use of a servo device to operate the manual lever.

In the accompanying drawings:

FIGURE 1 is a schematic general view of the front portion of a coach chassis, illustrating the use of a variable-ratio lever mechanism according to the invention to actuate a parking brake linkage for the wheel brakes of a first and second pair of steerable wheels;

FIGURE 2 is a greatly enlarged elevational view of the variable-ratio lever mechanism shown in FIGURE 1; and FIGURES 3 to 6 are somewhat enlarged elevational views showing the variable-ratio lever mechanism in an "off" position, two intermediate positions, and a "fully on" position, respectively.

In FIGURE 1, a variable-ratio lever mechanism 10 is shown mounted by means of a bracket 12 on a longitudinal frame member 14 of a coach chassis 16. Movement of an output member 18 of the lever mechanism is transmitted by way of a Bowden cable 20 to a pivotally mounted front relay lever 22, which is in turn connected by left- and right-hand relay cross rods 24 and respective Bowden cables 26 to left- and right-hand brake shoe assemblies 28 for a first, front pair of steerable wheels (not shown). The front relay lever 22 is also connected by means of a relay rod 30 to a rear relay lever 32, which is in turn connected by left- and right-hand relay cross rods 34 and respective Bowden cables 36 to left- and right-hand brake shoe assemblies 38 for a second pair of steerable wheels (also not shown). The brake shoe assemblies 28 and 38 are conventional two leading-shoe assemblies which are also hydraulically operable in response to movement of a footbrake pedal 40, such movement being transmitted by a push rod 42 to a pressure servo unit 44 to cause hydraulic fluid to be supplied via conduits 46 to wheel brake cylinders 48 of the respective brake shoe assemblies 28 and 38. A conduit 46' additionally supplies hydraulic fluid to corresponding wheel brake cylinders of left- and right-hand brake shoe assemblies for a pair of rear wheels (not shown).

As is shown for example in FIGURE 2, the variable-ratio lever mechanism 10 includes a manual lever 50 comprising a first arm 52 serving as a hand lever for actuation by the vehicle driver and a second, relatively short arm 54 which is pivotally mounted by a pivot bolt C on one end portion of a brake actuator lever 56 constituting an output actuator lever. The brake actuator lever 56, as is shown generally in FIGURE 1, is constructed as a pair of laterally spaced, interconnected side plates, and is mounted on a fixed pivot bolt O intermediate its ends, the other end portion of the brake actuator lever being apertured at a point Q to provide a pivotal connection to the output member 18 (shown in FIGURE 3) for actuation of the mechanical parking brake of the vehicle. The free end portion of the second arm 54 of the manual lever 50 is pivotally connected at a pivot point $G_1$ to one end of a yieldable connection constituted by a compression spring assembly 58 the other end of which is pivotally connected to the brake actuator lever at a pivot point $G_2$ spaced from the fixed pivot O.

The fixed pivot bolt O for the brake actuator lever 56 is supported by a fixing bracket assembly 60 which is bolted at L, M and N to the bracket 12 which is shown in FIGURE 1, and constitutes a fixed portion of the vehicle. A part of the fixing bracket assembly is formed as a fixed ratchet 62 of arcuate form.

A pawl lever 64 is mounted at one end on the fixed pivot bolt O, and is pivotally connected at a point B intermediate its ends to one end of a straight link member 66 the other end of which is pivotally connected to the second arm 54 of the manual lever 50 at a point A between the pivotal connection $G_1$ of the compression spring assembly 58 and the mounting pivot C. The manual lever 50, the brake actuator lever 56 and the pawl lever 64 are cranked as seen in elevation.

A locking pawl 68 is pivotally mounted on the pawl lever 64 by means of a pivot pin H at the end of the pawl lever remote from the fixed pivot O, and carries a laterally projecting pin I. A hairpin torsion spring 70 is mounted at its central portion on the pivot pin H, and has end portions which engage facing portions of a pin P projecting from the locking pawl 68 and of the pin I projecting from the pawl lever 64, such that the torsion spring 70 resiliently biases the locking pawl 68 towards the fixed ratchet 62. The pin P projecting from the locking pawl 68 engages an abutment surface 73 on the brake actuator lever 56 in some positions of the mechanism to prevent the locking pawl 68 from engaging the fixed ratchet 62, as will subsequently be described in relation to the operation of the hand-brake mechanism.

A release pawl 74 is pivotaly mounted at a point J on the brake actuator lever 56, and is resiliently biased by a compression spring 76 into engagement with a set of teeth on the fixed ratchet 62. The fixed ratchet teeth engageable by the release pawl 74 are disposed on a convexly arcuate surface of the fixed ratchet, whereas the teeth engageable by the locking pawl 68 are disposed on the other side of the fixed ratchet, on a concavely arcuate surface, both sets of ratchet teeth facing in the same direction. A pawl release lever 78 which as shown in FIGURE 3 is pivotally mounted at a point S on the free end portion 52 of the manual lever 50 is connected by means of a Bowden cable 80 to a point K on the release pawl 74, and is operable to disengage the release pawl from the fixed ratchet teeth. A stop pin F interconnecting the two plates of the brake actuator lever 56 in the vicinity of the mounting pivot C for the manual lever 50 serves to limit movement of the manual lever relatively to the brake actuator lever in a brake release direction.

To operate the handbrake mechanism, the vehicle driver pulls the hand lever portion 52 of the manual lever 50 from its "off" position towards the "on" position. In an initial increment of movement of the manual lever, the resistance of the brake relay mechanism acting on the output member 18 is insufficient to cause yielding of the compression spring assembly 58 arranged between the manual lever and the brake actuator lever 56, and accordingly the manual lever and the brake actuator lever move as a whole about the fixed pivot O, forming a simple two-arm lever for take-up of play or slack in the brake relay mechanism at a low mechanical advantage.

When the play or slack has been taken up, the resistance offered by the output member 18 is such that further movement of the manual lever causes yielding of the compression spring assembly 58. The manual lever 50 thereupon rotates relatively to the brake actuator lever 56 in a clockwise direction about the pivot C between these two levers. The resulting clockwise movement of the short arm 54 of the manual lever about the pivot C is transmitted by the link member 66 to the pawl lever 64, and causes the pawl lever to rotate relatively to the brake actuator lever 56, in an anti-clockwise direction about the fixed pivot bolt O. This action continues until, as shown in FIGURE 4, the relationship between the abutment surface 72 on the brake actuator lever and the pin P projecting from the locking pawl 68 is such that this pin can slide along and thereby be released from the abutment surface to allow the locking pawl to begin to engage one of the set of teeth on the concave surface of the fixed ratchet 62, as shown in FIGURE 5.

When the locking pawl 68 engages the fixed ratchet 62, no further anti-clockwise movement of the pawl lever 64 is possible, because both ends of the pawl lever are held fixed. During further movement of the manual lever 50, movement of the brake actuator lever 56 occurs at an increased mechanical advantage, by virtue of a four-bar chain mechanism BACO (best seen in FIGURE 2), the link OB of which is fixed, this four-bar chain mechanism being constituted by the link member 66 (BA), the part AC of the short arm 54 of the manual lever 50, the part CO of the brake actuator lever 56, and the pawl lever 64 (fixed link OB). Finally, the pivotal connection $G_1$ between the short arm 54 of the manual lever and the compression spring assembly 58 passes the line which joins the pivotal connection C between the manual lever 50 and the brake actuator lever 56 to the pivotal connection $G_2$ between the compression spring assembly and the brake actuator lever, whereupon an over-centre action occurs which causes the compression spring assembly to assist the final increment of movement of the hand lever into the "on" position, in which the brake is fully engaged.

To disengage the brake, pressure is applied to the hand lever to relieve the load on the release pawl 74, and the pawl release lever 78 is actuated to disengage the release pawl from the fixed ratchet teeth 62; this causes disengagement of the brake, with changes in the mechanism occuring in the reverse order to that during the brake engagement. Movement of the hand lever in the release direction is limited by the stop pin F of the brake actuator lever.

By means of the variable-ratio lever mechanism which has been described, a large output movement at a very low mechanical advantage is possible for take-up of play or slack in the brake relay mechanism, followed by movement at a high mechanical advantage for brake engagement, with assistance from the compression spring assembly. With a link configuration such as is shown in the accompanying drawings, the mechanical advantage increases progressively after the changeover position at which take-up of play or slack ceases and brake engagement begins, thereby producing a favourable course of brake engagement, with the assistance given by the over-centre action of the compression spring contributing to good efficiency.

For the variable-ratio lever mechanism shown in the drawings, the lever ratio during the initial increment of movement of the manual lever is $$\frac{DO}{OQ} \frac{\cos \alpha}{\cos \beta}$$

where D (shown in FIGURES 3 and 6) is the effective point of application of manual force to the manual lever 50, and $\alpha$ and $\beta$ are the angles shown in FIGURE 2 and in the list below, namely the angle CDO and the acute angle between QO and the vertical, respectively.

The lever ratio during the final increment of movement of the manual lever is $$\frac{DE}{OQ} \frac{OC}{EC} \frac{\cos \alpha'}{\cos \beta'}$$

(excluding the effect of the spring), where "E" (shown in FIGURE 6) is a point at the intersection of an axis joining the points O and C and an axis joining the points A and B, at and immediately after the changeover position, and $\alpha'$ and $\beta'$ are the angles shown in FIGURES 5 and in the list below, namely the angle CDE and the acute angle between QO and the vertical, respectively. If the efficiency is assumed to be 100%, the initial mechanical advantage (in the FIGURE 3 position) is $$\frac{DO}{OQ} \cdot \frac{\cos \alpha}{\cos \beta}$$

and the final mechanical advantage (in the FIGURE 6 position) is $$\frac{DE}{OQ} \cdot \frac{OC}{EC} \cdot \frac{\cos \alpha'}{\cos \beta'} - \frac{DC(OC-EC)}{OQ \cdot EC \cdot \cos \beta'} \cdot \frac{F_s}{F_H}$$

where:

$F_H$=force applied at point D on handle, normally to DC;

$$F_s = \frac{Sl_1}{DC}\left[\frac{L+t_1+t_2}{l+\Lambda^2-2K\cos\theta^{1/2}} - R_5\right]\sin\theta$$

= force at point D on handle, normally to DC, due to spring only;

$S$=stiffness of spring;
$l_1 = CG_2$;
$L$=free length of spring;
$t_1+t_2$=length of attachment portions at ends of spring;
$L=t_1+t_2$=length $G_1G_2$ when spring is free;
$K=l_1/R_5$
$R_5=CG_1$;
$\theta$=angle $GCG_2$;
$\alpha$=angle $CDO$;
$\alpha'$=angle $CDE$; and
$\beta$ and $\beta'$=the angles between QO and the vertical through O in the positions shown in FIGURES 3 and 6 respectively.

I claim:

1. A variable-ratio lever mechanism comprising a manual lever having a first, manually movable arm and a second arm, an output actuator lever, a fixed pivot intermediate the ends of the output actuator lever, the output actuator lever having one end portion on which the manual lever is pivotally mounted and another end portion which is connected to an output linkage, the second arm of the manual lever being pivotally connected to one end of a resiliently yieldable link the other end of which is pivotally connected to the output actuator lever at a point spaced from the fixed pivot, and a link member pivotally connecting the manual lever at a point between the pivot for the yieldable link and the mounting pivot for the manual lever to a pawl lever one end portion of which is pivotally mounted on the fixed pivot and the other end portion of which forms a pivotal mounting for a locking pawl which in one position of the mechanism can engage a fixed ratchet, the arrangement being such that in an initial increment of movement of the manual lever the mechanism moves as a whole about the fixed pivot, in a further increment of movement the yieldable link yields at a design output load and allows the link member to move the pawl lever about the fixed pivot to bring the locking pawl into engagement with the fixed ratchet, and in a final increment of movement a four-bar chain mechanism constituted by one arm of the manual lever, the link member, the pawl lever and the output actuator lever produces an increased mechanical advantage at the output actuator lever.

2. A variable-ratio lever mechanism according to claim 1, wherein the yieldable link comprises a compression spring assembly.

3. A variable-ratio lever mechanism according to claim 1, wherein the yieldable link comprises a compression spring assembly which gives an over-centre action between the initial and final increments of movement of the manual lever, such that in the final increment of movement the compression spring assembly provides an increased force at the output actuator lever.

4. A variable-ratio lever mechanism according to claim 1, wherein the locking pawl is resiliently biased towards the fixed ratchet, and, during the initial increment of movement of the manual lever, a pin-and-abutment connection between the locking pawl and the output actuator lever maintains the locking pawl out of contact with the fixed ratchet.

5. A variable-ratio lever mechanism according to claim 1, wherein the fixed ratchet has two sets of teeth, one set comprising the fixed ratchet teeth engageable by the release pawl, which are disposed on a convexly arcuate surface of the fixed ratchet, and the other set comprising the teeth engageable by the locking pawl, which are disposed on a concavely arcuate surface of the fixed ratchet, both sets of teeth facing in the same direction.

6. A variable-ratio lever mechanism according to claim 1, including a release pawl pivotally mounted on the output actuator lever and resiliently biased into engagement with the fixed ratchet teeth to prevent return movement of the mechanism, and a release lever mounted on one arm of the manual lever and actuable to disengage the release pawl from the fixed ratchet teeth.

7. A variable-ratio lever mechanism according to claim 1, wherein the output actuator lever has an abutment positioned to limit movement of the manual lever relatively to the actuator lever in the release direction.

8. A variable-ratio lever mechanism according to claim 1, wherein the output actuator lever comprises a pair of spaced side plates between which the remaining parts of the lever mechanism are mounted.

References Cited

UNITED STATES PATENTS 2,985,032  5/1961  Schröder et al. _____ 74—536
3,310,994  3/1967  Schröter _____ 74—516

FRED C. MATTERN, JR., *Primary Examiner.*

C. F. GREEN, *Assistant Examiner.*